(No Model.)
J. A. SCARBOROUGH.
VEHICLE SHAFTS.
No. 463,923. Patented Nov. 24, 1891.
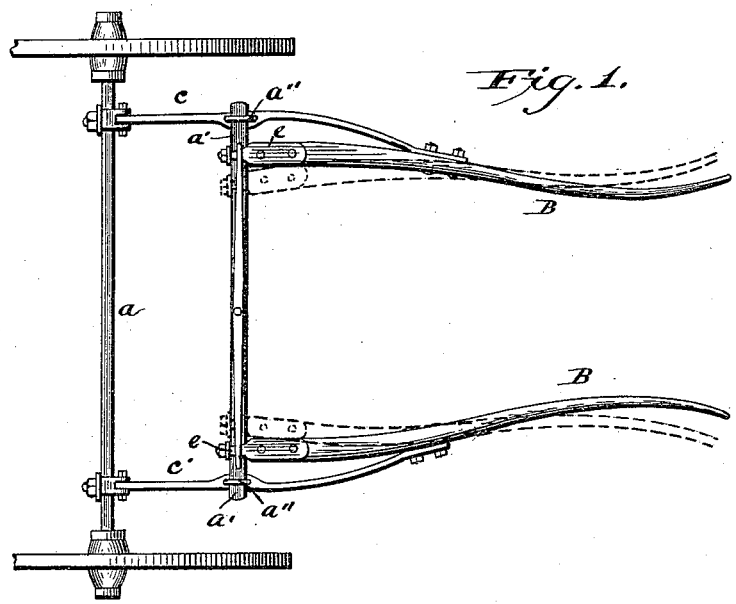
Fig. 1.
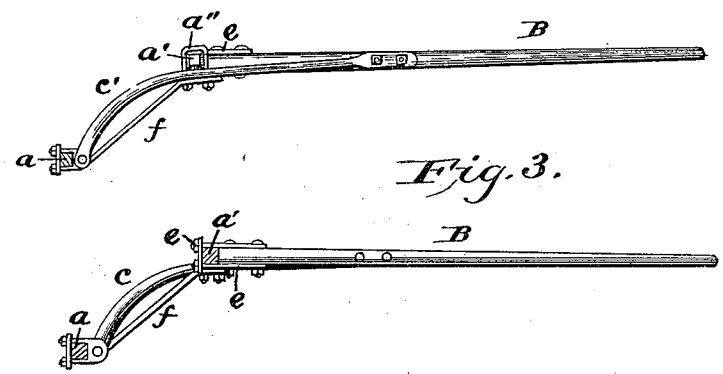
Fig. 2.
Fig. 3.
Witnesses
Frank C. Gibson.
R. W. Bishop
Inventor
J. A. Scarborough
By his Attorneys
Alexander & Davis

UNITED STATES PATENT OFFICE.

JAMES ALLEN SCARBOROUGH, OF WESSON, MISSISSIPPI.

VEHICLE-SHAFT.

SPECIFICATION forming part of Letters Patent No. 463,923, dated November 24, 1891.

Application filed March 14, 1891. Serial No. 385,018. (No model.)

*To all whom it may concern:*

Be it known that I, JAMES ALLEN SCARBOROUGH, a citizen of the United States, residing at Wesson, in the county of Copiah and State of Mississippi, have invented certain new and useful Improvements in Vehicle-Shafts, of which the following is a specification, reference being had therein to the accompanying drawings.

In the accompanying drawings, Figure 1 represents a plan view of one form of my invention; Fig. 2, a side elevation thereof, and Fig. 3 a longitudinal sectional view.

The essential object of this invention is to produce a pair of vehicle-shafts that shall be adjustable with respect to each other in order that they may be readily accommodated or adjusted to suit different-sized animals, that shall be very strong and durable notwithstanding their adjustability, and that shall be comparatively simple and inexpensive and easily repaired, as will be more fully hereinafter pointed out.

Referring to the drawings by letters, $a$ designates an ordinary axle, to which a pair of draft or thill irons $c$ $c'$ are pivotally connected in the usual or any improved manner. These thill-irons curve upward and forward and are rigidly connected together by a cross-bar $a'$, this bar carrying the singletree and being attached to the irons by suitable adjustable clamps or clips $a''$. The forward portions of the thill-irons are curved inwardly toward each other slightly and have their ends bolted or otherwise secured to the shafts proper B B, the rear ends of which are rigidly but adjustably attached to the cross-bar $a'$ by means of suitable iron clips $e$ $e$. Should it be desired or found necessary, a short flat brace-bar $f$ may be secured under the rear end of each of the thill-irons to brace and strengthen the same.

By loosening the bolts of the clips $e$ $e$, the rear ends of the shafts may be readily adjusted, either inwardly or outwardly, to accommodate different-sized animals, and after they are properly adjusted they may be again rigidly secured by simply tightening the clip-bolts. The forward portions of the thill-irons may be sufficiently elastic to permit the adjustment of the shafts, or this adjustment may be permitted by loosening the clips that bind the thill-irons to the cross-bar, which latter manner is the preferable one. With this invention the animal will have the advantage, being eight or ten inches nearer the draft, and the vehicle may be guided with much less exertion than with the ordinary form of shafts.

While the foregoing details of construction constitute preferred devices for carrying out the principles of my invention and involve constructions which I regard as the best for such purpose, it will be apparent to those skilled in the art that various modifications and changes may be made, and hence, for the broader purposes of my invention, I do not confine myself to the precise construction shown.

Another advantage of this invention lies in the fact that by its use the disagreeable movement commonly called "horse-motion" is done away with, this being particularly due to the elasticity of the forward portions of the thill-irons. A further advantage is that the vehicle is less easily capsized than with the ordinary shafts. It will also be observed that by my improved shafts the vehicle is kept directly behind the horse, whereby the vehicle is prevented from swinging around or sliding sidewise and jerking the animal to one side or the other when on hillsides.

Having thus described my invention, what I claim, and desire to secure by Letters Patent, is—

1. The combination of an axle, a pair of thill-irons pivoted thereto and extended forwardly therefrom and curved inwardly toward each other, a cross-bar $a'$, adjustably connecting the thill-irons at points intermediate their ends, clips $a''$, adjustably connecting the cross-bar to the thill-irons, and a pair of shafts adjustably connected to the cross-bar inside of the thill-irons, the forward inwardly-curved ends of the thill-irons being connected to the respective shafts, substantially as described.

2. The combination of an axle, a pair of thill-irons connected thereto and extended forwardly and bent inwardly at their forward ends, a cross-bar $a'$, connecting the thill-irons intermediate their ends, and a pair of shafts connected at their rear ends adjustably to the cross-bar inside of the thill-irons, the forward inwardly-bent ends of the thill-irons being elastic and connected to the respective shafts, substantially as described.

In testimony whereof I affix my signature in presence of two witnesses.

JAMES ALLEN SCARBOROUGH.

Witnesses:
JOHN S. BEESLEY,
WILLIAM L. LITTLE.